(12) United States Patent
Agrawal et al.

(10) Patent No.: US 12,200,101 B2
(45) Date of Patent: Jan. 14, 2025

(54) SEMI-CUSTOM ACCELERATOR DEVICE FOR BOOTSTRAPPABLE FULLY HOMOMORPHIC ENCRYPTION

(71) Applicant: Trustees of Boston University, Boston, MA (US)

(72) Inventors: Rashmi S. Agrawal, Cambridge, MA (US); Ajay J. Joshi, Lexington, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 18/742,330

(22) Filed: Jun. 13, 2024

(65) Prior Publication Data

US 2024/0421971 A1 Dec. 19, 2024

Related U.S. Application Data (60) Provisional application No. 63/472,954, filed on Jun. 14, 2023.

(51) Int. Cl.
*H04L 9/00* (2022.01)

(52) U.S. Cl.
CPC .................................... *H04L 9/008* (2013.01)

(58) Field of Classification Search
CPC ....................................................... H04L 9/008
See application file for complete search history.

(56) References Cited

U.S. PATENT DOCUMENTS

| | | | |
|---|---|---|---|
| 10,387,122 B1* | 8/2019 | Olsen | G06N 3/063 |
| 2004/0016002 A1* | 1/2004 | Handelman | G06Q 30/04 |
| | | | 725/152 |
| 2007/0075746 A1* | 4/2007 | Fruhauf | G01R 31/31719 |
| | | | 326/93 |
| 2016/0350077 A1* | 12/2016 | Peeters | G06F 7/72 |
| 2018/0004270 A1* | 1/2018 | Journet | H04B 5/79 |
| 2018/0315398 A1* | 11/2018 | Kaul | G06N 3/045 |
| 2019/0044717 A1* | 2/2019 | Loisel | H04L 9/002 |
| 2020/0067693 A1* | 2/2020 | Lhermet | G06F 21/554 |
| 2020/0310761 A1* | 10/2020 | Rossi | H03M 7/18 |
| 2021/0211869 A1* | 7/2021 | Lee | H04W 4/44 |
| 2021/0320796 A1* | 10/2021 | Koziel | H04L 9/304 |
| 2022/0012593 A1* | 1/2022 | Huang | G06N 3/045 |
| 2022/0180158 A1* | 6/2022 | Whatmough | G06F 17/15 |

(Continued)

OTHER PUBLICATIONS

Riazi, et al.; "HEAX: An Architecture for Computing on Encrypted Data," ASPLOS 2020, Mar. 16-20, 2020, pp. 1295-1309.

(Continued)

*Primary Examiner* — Gary S Gracia
(74) *Attorney, Agent, or Firm* — BainwoodHuang (57) ABSTRACT

An FPGA-based accelerator for bootstrappable fully homomorphic encryption (FHE) employs (1) acceleration of scalar arithmetic operations using a multi-word approach for efficient utilization of standard-width components (multipliers/adders) on custom-width operands; (2) a performant, shift-based modular reduction technique that avoids the need for expensive multipliers; (3) an improved datapath for an expensive Key Switch operation; and (4) an efficient organization of on-chip memory for storing custom-width operands and supplying them at high bandwidth to computation units.

10 Claims, 8 Drawing Sheets

(56) References Cited

U.S. PATENT DOCUMENTS

| | | | |
|---|---|---|---|
| 2022/0255742 A1* | 8/2022 | Koziel | H04L 9/14 |
| 2022/0405221 A1* | 12/2022 | Wang | G06N 3/063 |
| 2023/0008622 A1* | 1/2023 | Boyd | G06N 3/063 |
| 2023/0025869 A1* | 1/2023 | Rao | G06F 21/602 |
| 2023/0027423 A1* | 1/2023 | Rao | G06F 7/5443 |
| 2023/0141837 A1* | 5/2023 | Moon | H04L 9/0656 713/189 |
| 2023/0188322 A1* | 6/2023 | Bajpeyi | H04L 9/008 |
| 2023/0291541 A1* | 9/2023 | Gupta | H04L 9/3093 |
| 2024/0078283 A1* | 3/2024 | Gradstein | G06F 9/30038 |
| 2024/0160771 A1 | 5/2024 | Hansen et al. | |

OTHER PUBLICATIONS

Turan, et al.; "HEAWS: An Accelerator for Homomorphic Encryption on the Amazon AWS FPGA," IEEE Transactions on Computers, vol. 69, No. 8, Aug. 2020, pp. 1185-1196.

Reagen, et al.; "Cheetah: Optimizing and Accelerating Homomorphic Encryption for Private Inference," 2021 IEEE International Symposium on High-Performance Computer Architecture (HPCA), Feb. 27-Mar. 3, 2021, pp. 26-39.

Jung, et al.; "Accelerating Fully Homomorphic Encryption Through Architecture-Centric Analysis and Optimization," IEEE Access, vol. 9, 2021, pp. 98772-98789.

Cousins, et al.; "Designing an FPGA-Accelerated Homomorphic Encryption Co-Processor," IEEE Transactions on Emerging Topics in Computing, vol. 5, Issue 2, 2016, pp. 193-206.

Wang, et al.; "FPGA Implementation of a Large-Number Multiplier for Fully Homomorphic Encryption," ISCAS 2013, May 19-23, 2013, pp. 2589-2592.

Cousins, et al.; "An FPGA Co-Processor Implementation of Homomorphic Encryption," HPEC 2014, Sep. 9-11, 2014, pp. 1-6.

Syafalni, et al.; "Efficient Homomorphic Encryption Accelerator With Integrated PRNG Using Low-Cost FPGA," IEEE Access, vol. 10, 2022, pp. 7753-7771.

Yang, et al.; "FPGA-Based Hardware Accelerator of Homomorphic Encryption for Efficient Federated Learning," Arxiv:2007.10560v1, Jul. 21, 2020, pp. 1-7.

Roy, et al.; "FPGA-based High-Performance Parallel Architecture for Homomorphic Computing on Encrypted Data," 2019 IEEE International Symposium on High Performance Computer Architecture (HPCA), Feb. 16-20, 2019, pp. 387-398.

Su, et al.; "FPGA-Based Hardware Accelerator for Leveled Ring-LWE Fully Homomorphic Encryption," IEEE Access, vol. 8, 2020, pp. 168008-168025.

Gener, et al.; "An FPGA-based Programmable Vector Engine for Fast Fully Homomorphic Encryption over the Torus," Secure and Private Systems for Machine Learning (ISCA Workshop), 2021, pp. 1-7.

Ozturk, et al.; "A Custom Accelerator for Homomorphic Encryption Applications," IEEE Transactions on Computers, vol. 66, No. 1, Jan. 2017, pp. 3-16.

Feldmann, et al.; "F1: A Fast and Programmable Accelerator for Fully Homomorphic Encryption," MICRO 2021, Oct. 18-22, 2021, pp. 238-252.

Mkhinini, et al.; "HLS Design of a Hardware Accelerator for Homomorphic Encryption," IEEE Design and Diagnostics of Electronic Circuits and Systems (DDECS) 2017, Apr. 19-21, 2017, pp. 1-6.

Cilardo, et al.; "Securing the Cloud with Reconfigurable Computing: An FPGA Accelerator for Homomorphic Encryption," Design, Automation and Test in Europe (DATE) 2016, Mar. 14-18, 2016, pp. 1622-1627.

Samardzic, et al.; "CraterLake: A Hardware Accelerator for Efficient Unbounded Computation on Encrypted Data," ISCA 2022, Jun. 18-22, 2022, pp. 173-187.

Samardzic, et al.; "BitPacker: Enabling High Arithmetic Eciency in Fully Homomorphic Encryption Accelerators," ASPLOS 2024, Apr. 27-May 1, 2024, pp. 137-150.

Kim, et al.; "SHARP: A Short-Word Hierarchical Accelerator for Robust and Practical Fully Homomorphic Encryption," ISCA 2023, Jun. 17-21, 2023, pp. 1-15.

Zhang, et al.; "SoK: Fully Homomorphic Encryption Accelerators," ACM Computing Surveys, Jul. 5, 2024, pp. 1-31.

Kim, et al.; "BTS: An Accelerator for Bootstrappable Fully Homomorphic Encryption," ISCA 2022, Jun. 18-22, 2022, pp. 711-725.

Kim, et al.; "ARK: Fully Homomorphic Encryption Accelerator with Runtime Data Generation and Inter-Operation Key Reuse," MICRO 2022, Oct. 1-5, 2022, pp. 1237-1254.

Aikata, et al.; "REED: Chiplet-based Accelerator for Fully Homomorphic Encryption," Arxiv 2308.02885v2, May 1, 2024, pp. 1-18.

Aikata, et al.; "Kavach: Lightweight masking techniques for polynomial arithmetic in lattice-based cryptography," TCHES 2023, vol. 2023, No. 3, pp. 366-390.

Mukherjee, et al.; "ModHE: Modular Homomorphic Encryption Using Module Lattices Potentials and Limitations," Cryptology eprint, 2023/895, pp. 1-36.

Roy, et al.; "HEPCloud: An FPGA-based Multicore Processor for FV Somewhat Homomorphic Function Evaluation," IEEE Transactions on Computers, vol. 67, No. 11, 2018, pp. 1637-1650.

Hirner, et al.; "Proteus: A Pipelined NTT Architecture Generator," IEEE Transactions on Very Large Scale Integration Systems, vol. XX, No. 18, Feb. 2024, pp. 1-11.

Krieger, et al.; "Aloha-HE: A Low-Area Hardware Accelerator for Client-Side Operations in Homomorphic Encryption," Date 2024, pp. 1-6.

Samardzic; "Making Computation on Encrypted Data Practical through Hardware Acceleration of Fully Homomorphic Encryption," MIT, May 2022, pp. 1-87.

Arrufat; "Optimisation and evaluation of the CraterLake FHE accelerator on FPGA," MIT, Apr. 2024, pp. 109.

* cited by examiner

Algorithm 1: Addition in $\mathbb{F}_q$

Input: Modulus $q$, integers $a, b \in [0, q-1]$
Output: $c = (a+b) \mod q$ 1: Set $(A[1], A[0]) \leftarrow a$, $(B[1], B[0]) \leftarrow b$, $(mod[1], mod[0]) \leftarrow q$
2: $(carry0, C[0]) \leftarrow A[0] + B[0]$
3: $(carry1, C[1]) \leftarrow A[1] + B[1] + carry0$
4: if $carry1 = 1$ and $c[1] >= mod[1]$ and $c[0] >= mod[0]$ then
5:     $c = (C[1] - mod[1], C[0] - mod[0])$
6: else if $carry1 = 1$ and $c[1] >= mod[1]$ and $c[0] < mod[0]$ then
7:     $c = (C[1] - mod[1] - 1, C[0] - mod[0])$
8: else if $carry1 = 1$ and $c[1] < mod[1]$ and $c[0] >= mod[0]$ then
9:     $c = ((1, C[1]) - mod[1], C[0] - mod[0])$
10: else if $carry1 = 1$ and $c[1] < mod[1]$ and $c[0] < mod[0]$ then
11:     $c = (C[1], C[0] - mod[0])$
12: else
13:     $c = (C[1], C[0])$
14: end if
15: Return($c$)

Algorithm 17: Modular Reduction in $\mathbb{F}_q$

Input: Modulus $q$, $(2\log q - 1)$ bits integer $a$, $shifts = 6$
Output: $c = a \pmod{q}$
1: Precompute: $madd[i-1] = \sum_{j=0}^{5} i[j] \cdot 2^{\log q + j} \pmod{q}$ for $i = 1$ to $2^{shifts} - 1$
2: Set $(A[1], A[0]) \leftarrow a$, $count = 0$, $as_1 = 0$
3: while $count < \log q$ do
4: $\quad (carry, as_1) = A[1] \ll shifts$
5: $\quad A[1] = as_1 + madd[carry - 1]$
6: $\quad count = count + shifts$
7: end while
8: $c = A[1] + A[0]$
9: if $c > q$ then
10: $\quad c = c - q$
11: end if
$\quad$ return $c$

Fig. 9

```
Algorithm 3: Integer Multiplication
Input: Integers a, b ∈ [0, q − 1], t = 3
Output: c = (a.b)
 1: Set (A[t-1],...,A[0]) ← a, (B[t-1],...,B[0]) ← b
 2: Set C[i] ← 0 for 0 ≤ i ≤ 2t − 1
 3: for i from 0 to t − 1 do
 4:    U ← 0
 5:    for j from 0 to t − 1 do
 6:       (U,V) ← C[i+j] + A[i].B[j] + U
 7:       C[i+j] ← V
 8:    end for
 9:    C[i+t] ← U
10: end for
11: Return(c)
```

SEMI-CUSTOM ACCELERATOR DEVICE FOR BOOTSTRAPPABLE FULLY HOMOMORPHIC ENCRYPTION

BACKGROUND

The invention is generally related to the field of hardware accelerator devices for computing applications, in particular for systems employing fully homomorphic encryption (FHE) for data protection.

SUMMARY

Described herein is an FPGA-based accelerator for bootstrappable FHE having several improvements over known alternatives. These include (1) accelerating scalar arithmetic operations using a multi-word approach for efficient utilization of standard-width components (multipliers/adders) on custom-width operands; (2) a performant, shift-based modular reduction technique that avoids the need for expensive multipliers; (3) an improved datapath for an expensive Key Switch operation; and (4) an efficient organization of on-chip memory for storing custom-width operands and supplying them at high bandwidth to computation units.

One embodiment is directed to a semi-custom accelerator device for hardware acceleration of modular arithmetic operations in a cryptography system employing a cyphertext modulus Q with associated operand bit-width log q ('q). The semi-custom accelerator device includes memory for storing 'q-width operands and 'q-width results, and an arithmetic unit coupled to the memory to receive the 'q-width operands and produce the 'q-width results. The arithmetic unit includes (1) a plurality p of standard arithmetic blocks having 'q/p bit-width, the arithmetic blocks operating on corresponding distinct 'q/p-width portions of the 'q-width operands and producing corresponding distinct 'q/p-width portions of the 'q-width results, and (2) custom logic interconnecting the arithmetic blocks in a manner providing for an overall 'q-width arithmetic operation to produce the 'q-width results from the 'q-width operands.

In some arrangements, p=2.

In some arrangements, the custom logic includes (1) pipeline registers for receiving respective 'q/p-width portions of modulus values and time-aligning them with respective outputs of the p arithmetic blocks, (2) additional standard arithmetic blocks for operating on respective time-aligned 'q/p-width portions of modulus values and outputs of the p arithmetic blocks to produce respective portions of modulus-reduced arithmetic results, and (3) selection logic for selecting between the outputs of the p arithmetic blocks and the modulus-reduced arithmetic results to produce the 'q-width results.

In some arrangements, the selection logic is configured to realize a multi-condition selection based on values of respective carry outputs from the standard p arithmetic blocks. The multi-condition selection is based partly on a most-significant carry output being asserted and there being corresponding selection-specific mathematical relationships between the time-aligned 'q/p-width portions of modulus values and the respective outputs of the p arithmetic blocks.

Another embodiment is directed to a semi-custom accelerator device for hardware acceleration of modular arithmetic operations in a cryptography system employing a cyphertext modulus Q with associated operand bit-width 'q. The semi-custom accelerator device includes an arithmetic unit producing non-reduced values having a bit-width of $2*'q-1$, and a modular reduction unit coupled to the arithmetic unit to receive the $(2*'q-1)$-width non-reduced values and produce corresponding 'q-width reduced values. The modular reduction unit includes (1) a shifter operative to produce a first intermediate value v1 by a predetermined number of shifts of a second intermediate value v2, (2) an adder to produce v2 by adding v1 to a pre-computed modulus adder value, and (3) custom logic to (a) first initialize v2 to a most-significant part of a non-reduced value from the arithmetic unit, (b) then iteratively operate the shifter and adder over successive cycles to produce a final second intermediate value v2f, and (c) then combine v2f with a least-significant part of the non-reduced value from the arithmetic unit to produce the corresponding 'q-width reduced value.

Yet another embodiment is directed to a semi-custom accelerator device for hardware acceleration of a key switch operation in a fully homomorphic encryption system, the key switch operation converting a first ciphertext M1 decryptable under a first key to a same-message second ciphertext M2 decryptable under a distinct second key. The semi-custom accelerator device includes memory for storing operands and results of the key switch operation, and a set of computing elements including a decomposition unit, an up-modulus unit, an inner product unit, and a down-modulus unit. The decomposition unit is configured to generate blocks of first limbs of M1. The inner product unit has first and second sub-units, the first sub-unit configured to perform a first part of an inner product operation on the first limbs from the decomposition unit and producing an intermediate result, the second sub-unit configured to perform a remaining part of the inner product operation using the intermediate result and extended limbs generated by the up-modulus unit from the first limbs. The down-modulus unit is configured to perform a modulus-reducing operation on extended-modulus results from the inner product unit to produce M2.

Another embodiment is directed to a semi-custom accelerator device for hardware acceleration of operations in a fully homomorphic encryption system. The semi-custom accelerator device includes an array of N sets of functional units configured for parallel operation on corresponding ones of N streams of c-bit-width coefficients and producing corresponding ones of N streams of results, and a memory system coupled to the functional units to provide the coefficients to the functional units and to store the results. The memory system has one or more banks each organized as a two-dimensional arrangement of fixed-size memory units of bit-width m≠c, the two-dimensional arrangement having a width W and depth D of memory units, W being selected to enable storage of an integer number Wm/c of the c-bit-width coefficients across the width of the arrangement, D being selected as a quotient N/(Wm/c) to enable simultaneous retrieval of N coefficients in a single memory access cycle for use by the N functional units.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Incorporation by Reference of Prior US Provisional Application

The complete contents of U.S. Provisional Application No. 63/472,954 filed Jun. 14, 2023 are hereby incorporated by reference in their entirety. The description below includes specific references to U.S. Provisional Application No. 63/472,954 in the form of "Provisional Application, Section X", where X stands for a specific section number.

Overview

Fully Homomorphic Encryption (FHE) offers protection to private data on third-party cloud servers by allowing computations on the data in encrypted form. To support general-purpose encrypted computations, existing FHE schemes require an expensive operation known as "bootstrapping". Unfortunately, the computation cost and the memory bandwidth required for bootstrapping add significant overhead to FHE-based computations, limiting the practical use of FHE.

Described herein is an FPGA-based accelerator for bootstrappable FHE, which may be referred to as "FAB". Prior FHE accelerators have proposed hardware acceleration of basic FHE primitives for impractical parameter sets without support for bootstrapping. FAB, in contrast, accelerates bootstrapping (along with basic FHE primitives) on an FPGA for a secure and practical parameter set. Prior hardware implementations of FHE that included bootstrapping are heavily memory bound, leading to large execution times and wasted compute resources. One contribution of the disclosed approach is a balanced FAB design which is not memory bound. To this end, algorithms for bootstrapping are leveraged while being cognizant of the compute and memory constraints of FPGA hardware. To architect a balanced FAB design, a minimal number of functional units are used for computing, operate at a low frequency, leverage high data rates to and from main memory, utilize the limited on-chip memory effectively, and perform operation scheduling carefully. In one example FAB is realized using a single Xilinx Alveo U280 FPGA and by scaling it to a multi-FPGA system consisting of eight such FPGAs. FAB may outperform existing state-of-the-art CPU and GPU implementations for both bootstrapping and an example application of logistic regression (LR) model training. FAB may also provide competitive performance when compared to the state-of-the-art ASIC design, at a fraction of the cost.

Embodiments

Figure 1:
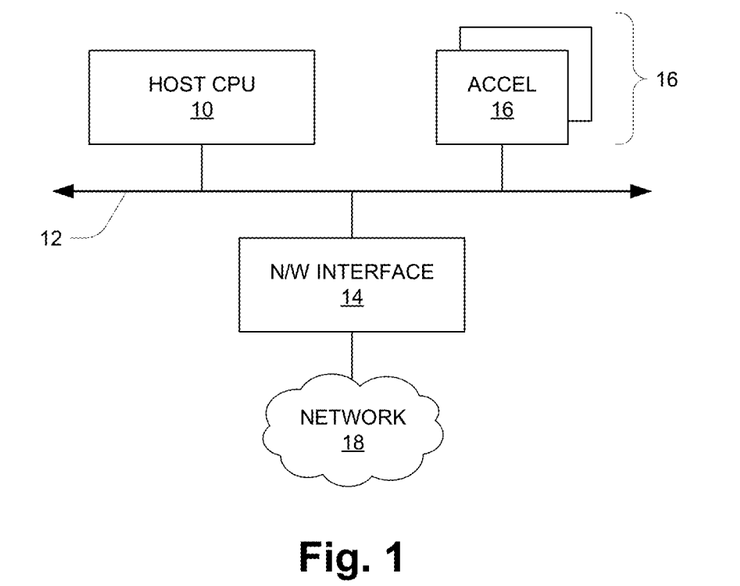
FIG. 1 is a block diagram of a computing system having one or more FHE accelerator devices.

FIG. 1 shows an example system arrangement having a host CPU 10 coupled via a system bus 12 (e.g., PCIe) to a (N/W) network interface 14 and a set of FPGA-based hardware accelerator modules (ACCEL) 16. The network interface 14 couples the system to an external network 18. In one embodiment the system may be realized in a so-called cloud computing platform.

In operation, the host CPU 10 executes higher-level portions of an FHE-based application, i.e., an application that utilizes and operates upon encrypted data using FHE techniques as generally known. In the system of FIG. 1, the host CPU 10 is also responsible for initialization of field-programmable element(s) of the accelerator modules 16, i.e., downloading customization logic in hardware description language (e.g., RTL) form, as described more below.

In particular, described herein is use of the system arrangement in an FHE scheme referred to as "Cheon-Kim-Kim-Song" or CKKS, which is outlined briefly below. Of particular relevance are operations of bootstrapping and key switching, including a number theoretic transform (NTT) and its inverse (INTT), all of which are outlined in the Provisional Application, Section 2.

Figure 2:
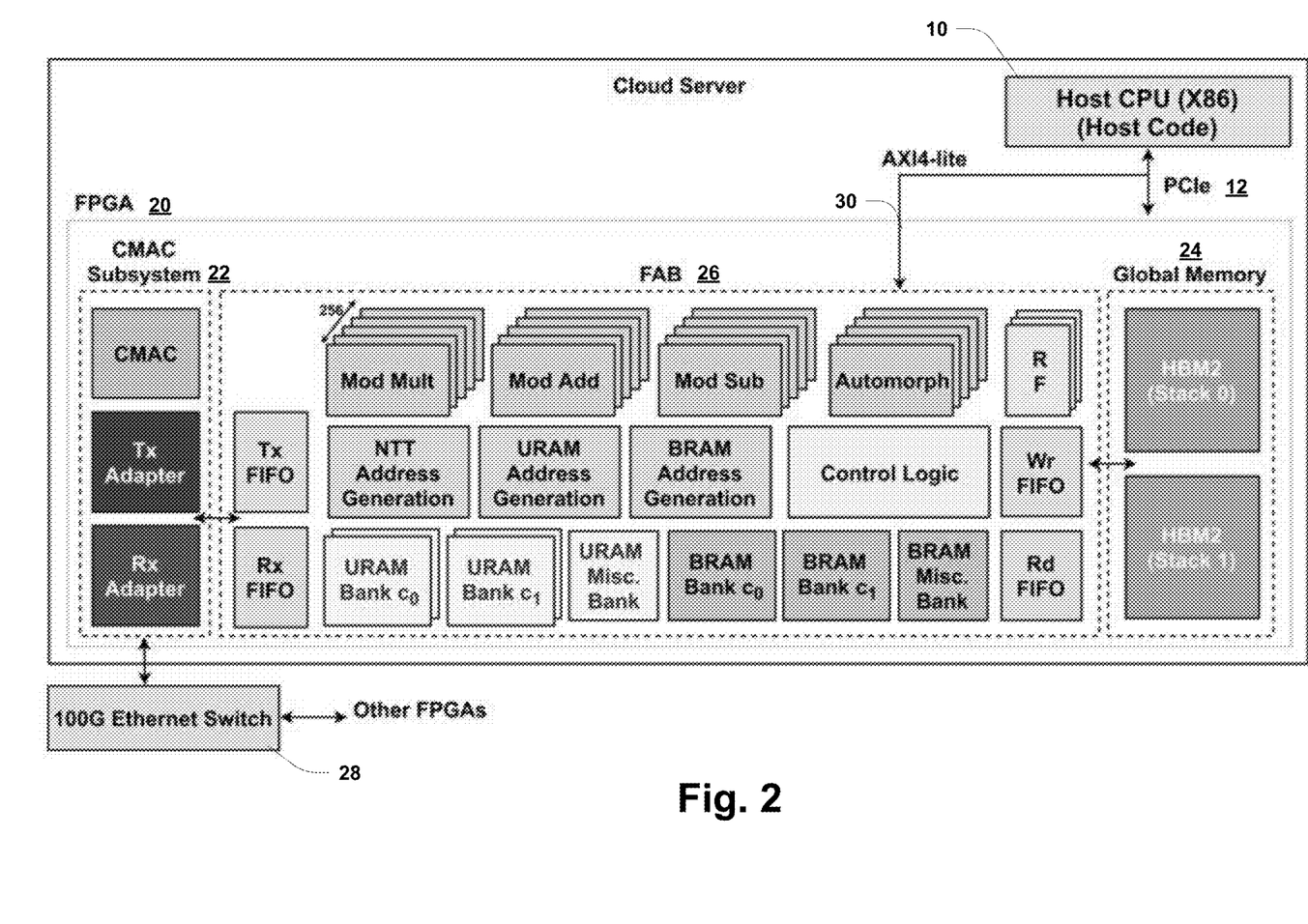
FIG. 2 is a block diagram of an FHE accelerator device.

FIG. 2 shows the system with particular emphasis on details of an accelerator 16, shown as FPGA 20. It includes a network interface shown as CMAC Subsystem 22, global memory 24, and a collection of processing logic shown as FAB 26. The host CPU 10 interacts with the FPGA 20 via PCIe 12. The CMAC subsystem 22 enables interaction among multiple FPGAs via an Ethernet Switch 28. The global memory 24 is shown as having two separate sets or stacks of high-bandwidth memory (HBM2).

The RTL design of the FAB 26 is packaged as a kernel code which is downloaded from the host 10 to the FPGA 20. To enable data transfer, the host 10 allocates a buffer of the dataset size in the global memory 24. The host code communicates the base address of the buffer to the kernel code using atomic register reads and writes through an AXI4-Lite interface 30 The host code also communicates all kernel arguments consisting of the system parameters like prime moduli, the degree of a polynomial modulus N, and certain pre-computed scalar values (to be stored in the register file) through this interface.

The kernel is started by the host code using an API call such as a Xilinx runtime (XRT) API call or OpenCL API call. Once the kernel execution starts, no data transfer occurs between the host and the global memory so as to interface all 32 AXI ports from the global memory 24 to the kernel code. The results are transferred back to the host code once the kernel execution completes.

The kernel code instantiates 256 sets of functional units each having a set of modular arithmetic units and an automorph unit (Automorph). The modular arithmetic units are a modular multiplier Mod Mult, modular addition Mod Add, and modulator subtraction Mod Sub. A small register file RF, which may be 2 MB in size for example, stores all required system parameters and precomputed scalar values that are received from the host 20. The RF also facilitates temporary storage of up to four polynomials that may be generated as intermediate results. Various details regarding all of these functional components are described further below.

The kernel has 32 memory-mapped 256-bit interfaces that are implemented using AXI4 master interfaces to enable bi-directional data transfers to/from the global memory. The kernel acts as a master accessing data stored in the global memory 24. Read (Rd) FIFO and write (Wr) FIFO stream the data between the global memory 24 and on-chip memory of the FAB 26, which includes URAM and BRAM resources organized into various banks as shown. The URAM memory banks are single-port banks, while the BRAM memory banks are dual-port banks. Also included respective address generation blocks for NTT, URAM and BRAM. A transmit (Tx) FIFO and a receive (Rx) FIFO stream data to and from the CMAC subsystem 22.

In one embodiment, the total capacity of all the RFs is 2 MB. The RFs are spread across the design and are used by functional, address generation, and control units. Each RF has multiple read/write ports with single-cycle access latency. About one-fourth of the RF is used to store pre-computed values and system parameters, which are written by the host CPU 10 through atomic writes before launching the kernel code execution. The remaining RFs are used to store up to four intermediate polynomials that are generated as part of Rotate or Multiply operations.

In one embodiment, there are 32 synchronous Wr and Rd FIFOs (supporting 32 AXI ports on the HBM side) to stream the data between the global memory 24 and the on-chip memory URAM, BRAM. These FIFOs are composed of distributed RAM available on the FPGA 20. The data width of each FIFO is equal to the data width supported by each AXI port i.e., 256~bits. The depth of the Wr FIFO is 128 to support an HBM burst length of 128. The depth of the Rd FIFO is 512 to support up to four outstanding reads. The Transmit (Tx) and Receive (Rx) FIFOs, used to stream data between the CMAC subsystem 22 and the on-chip memory URAM, BRAM, are also synchronous FIFOs having a 512-bit data interface.

Figure 3:
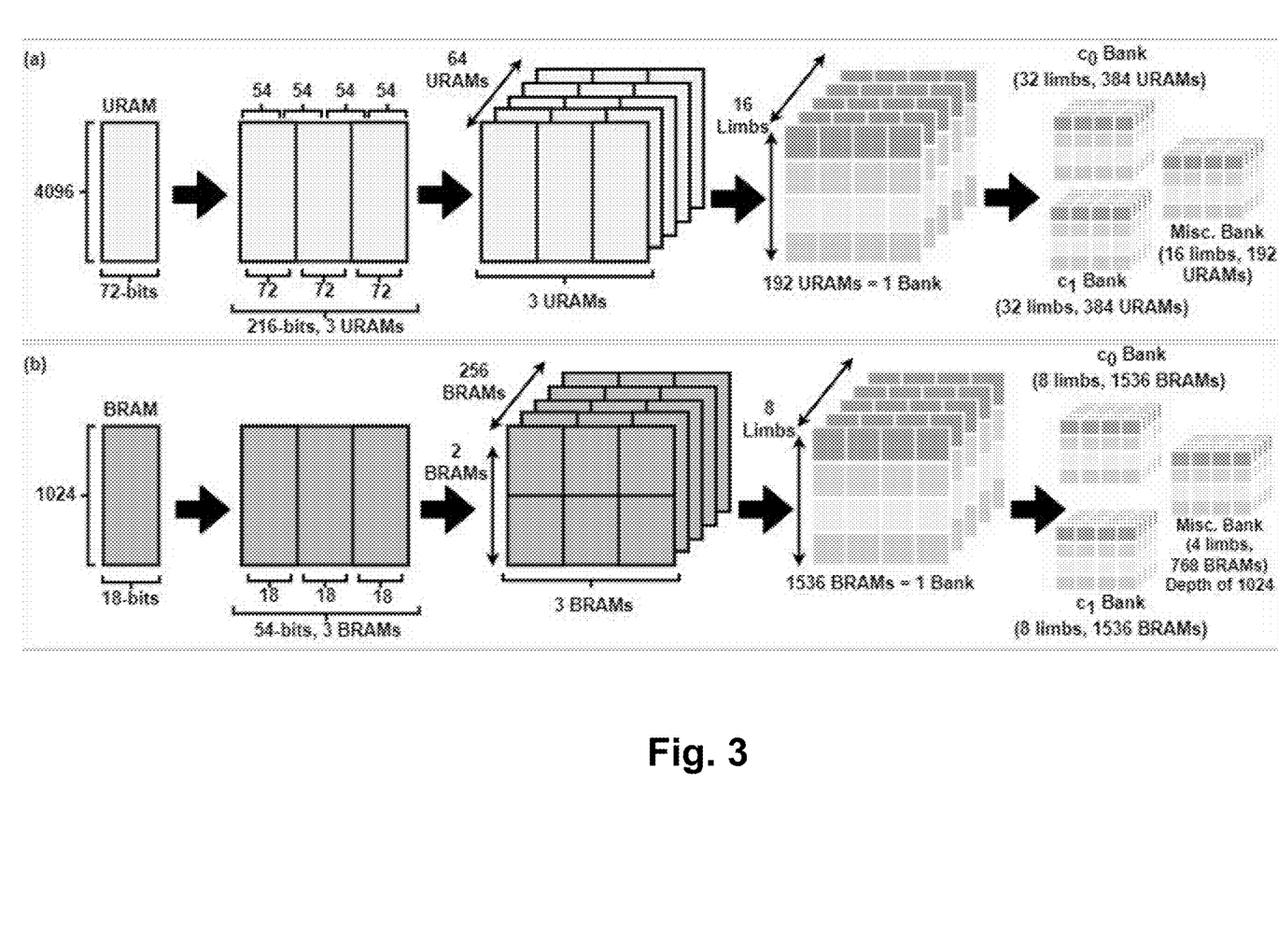
FIG. 3 is a schematic diagram of organization of on-chip memory resources.

FIG. 3 illustrates content and arrangement of on-chip memory. In one embodiment, there are 962 blocks of URAM where each block is 288 Kb in size and can be used as single-port memory. Further, there are 4032 blocks of BRAM where each block is 18 Kb in size and can be used as both single and dual-port memory. Using such a combination of single and dual-port memory banks constructed using URAM and BRAM blocks, a total capacity of 43 MB and an internal memory bandwidth of 30 TB/s may be realized.

As shown in FIG. 3, each URAM block has a data width of 72 bits and a depth of 4096. Three such URAM blocks are combined to achieve a data width of 216 bits, which allows for storing four 54-bit coefficients (216/4=54) at any given address. 64 of these 216-bit-wide subsets are arranged into a single URAM memory bank to enable storage of 256 coefficients. Thus, with every read and write, 256 54-bit coefficients are accessed in the same cycle, aligning with the number of functional units (see FIG. 2).

Using the above layout, a single memory bank consists of 64×3=192 URAMs and can store 16 polynomials (~7.08 MB). The overall available URAM blocks are organized into five such banks as follows:
1. The first two banks (c0 banks 1 and 2) store 31 limbs (23 original and 8 extension) of the c0 ring element of the ciphertext.
2. The next two banks (c1 banks 1 and 2) store 31 limbs (23 original and 8 extension) of the c1 ring element of the ciphertext.
3. The fifth bank can store 16 polynomials. The fifth bank is termed the "miscellaneous" bank as it is used to store multiple data items such as twiddle factors, Key Switch keys, and plaintext vectors that are read in from the global memory 24.

As shown in FIG. 3, the BRAM blocks are organized as 54-bit wide memory banks by combining three 18-bit wide BRAMs. As each address can store only a single 54-bit coefficient, 256 BRAM blocks are used to store 256 coefficients. In addition, the BRAM blocks are stacked two-high to get a depth of 2048, thus enabling storage of 8 polynomials in a single BRAM bank.

Similar to the URAM bank organization, the BRAM blocks are organized into multiple banks. There are three BRAM banks in total, where two banks consist of 1536 BRAMs each and can store 8 polynomials and thus, are ideal to store the extension limbs. The third bank consists of 768 BRAMs and can store 4 polynomials. The third bank is termed the "miscellaneous" bank and is used to store temporary data from the global memory 24 during various operations.

To summarize, FAB efficiently utilizes the available URAM/BRAM blocks on the FPGA 20 as on-chip memory. Mapping the data width of the polynomials to that of URAM/BRAM blocks enables storage of up to 43 MB of data on-chip, in one embodiment. FAB overcomes limited main memory bandwidth by utilizing a combination of single and dual-port memory banks that complement the operational needs of the underlying FHE operations, resulting in a balanced FPGA design.

Generally, the operations in FHE break down to integer modular arithmetic i.e., modular addition/subtraction and modular multiplication operations. Therefore, as shown in FIG. 2, each of the 256 functional units in FAB consists of modular multiplication, modular addition, and modular subtraction components, as well as an automorph unit. A multi-word arithmetic approach is used to reduce 54-bit operations to 27-bit operations for addition/subtraction and 18-bit operations for multiplication. This facilitates efficient utilization of standard DSP arithmetic blocks on the FPGA (i.e., library components of predetermined fixed widths different than the FHE operand width).

Figure 4:
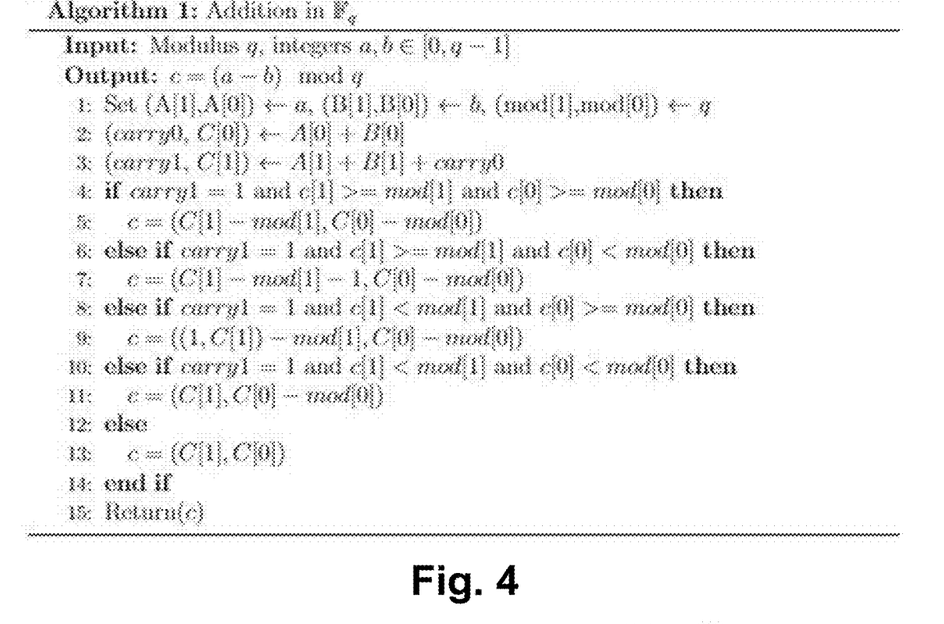
FIG. 4 is a pseudocode description of a technique of FHE addition.
Figure 5:
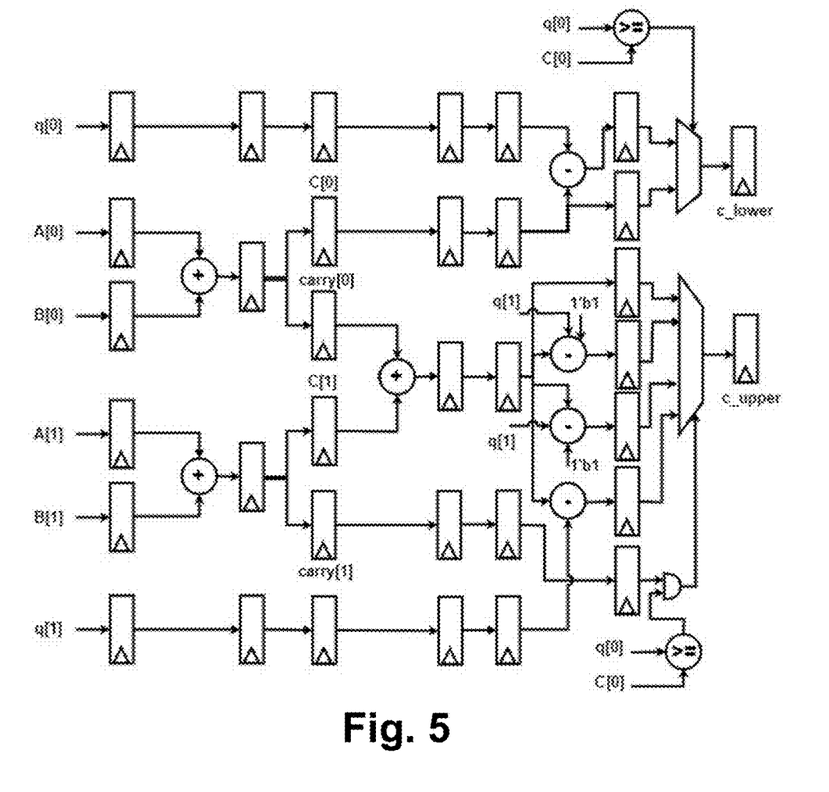
FIG. 5 is a schematic diagram of an FHE addition component.

FIGS. 4 and 5 illustrate multi-word modular addition and subtraction (Mod Add and Mod Sub in FIG. 2). Overall, 54-bit addition/subtraction operations are performed using two sets of 27-bit operations (for indices 0 and 1 respectively) and a complex of specialized carry and selection logic. FIG. 5 shows the FPGA hardware instantiated to realize the addition/subtraction algorithm shown in the pseudocode of FIG. 4. Note that the upper and lower modulus values mod[1] and mod[0] of FIG. 4 are shown as q[1] and q[0] in FIG. 5. Also, the upper and lower result values C[1] and C[0] of FIG. 4 are shown as c_upper and c_lower. With multi-word arithmetic and use of pipeline registers around the standard arithmetic blocks as shown, modular addition and subtraction can be performed in 7 clock cycles.

Figure 6:
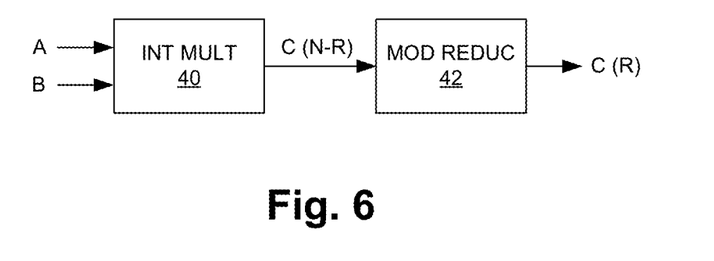
FIG. 6 is a block diagram of an FHE multiplication component.
Figure 7:
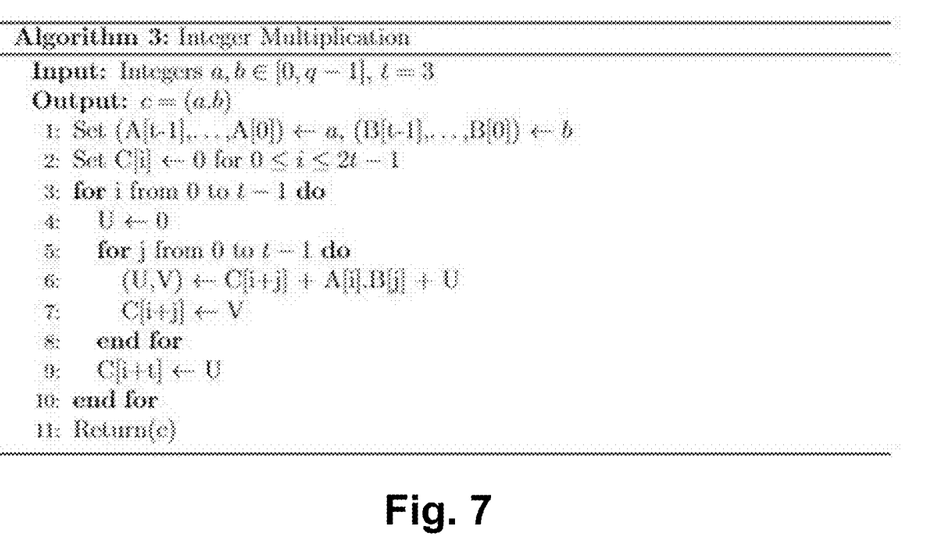
FIG. 7 is a pseudocode description of a technique of integer FHE multiplication.
Figure 8:
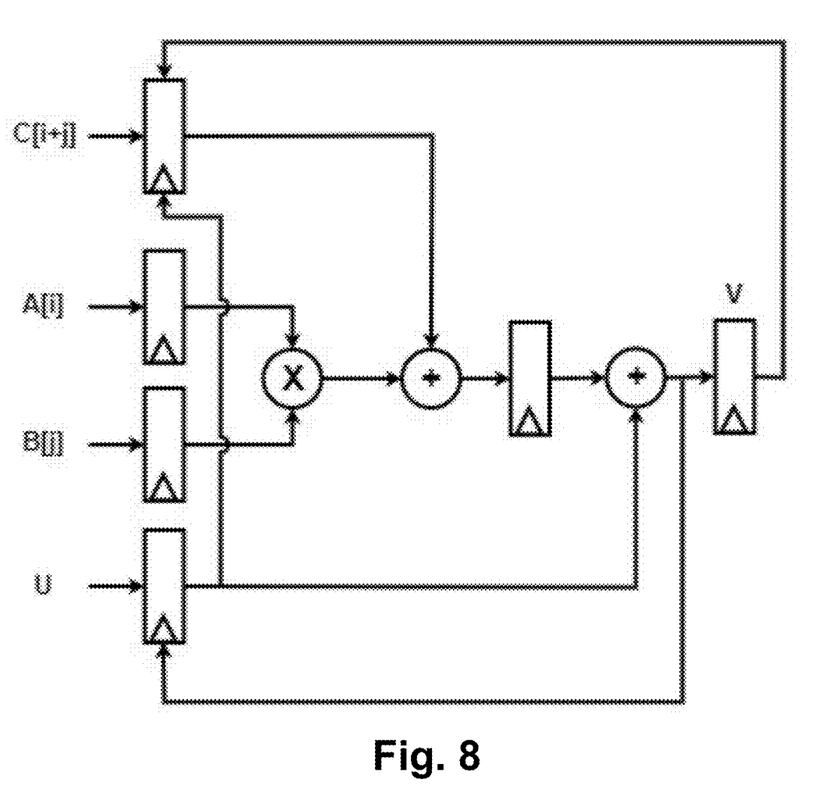
FIG. 8 is a schematic diagram of an integer FHE multiplication component.

FIGS. 6-9 illustrate modular multiplication (Mod Mult in FIG. 2). Generally, modular multiplication is accomplished by first multiplying the operands as integers, and then reducing the result. This implies a structure as shown in FIG. 6 in which modular multiplication is split across two operations i.e., an integer multiplication (Int Mult 40) producing a non-reduced result C(N-R), followed by modular reduction (Mod Reduc 42) producing a reduced result C(R), in a pipelined fashion. FIGS. 7 and 8 illustrate the integer multiplication 40 according to one embodiment, which is a technique referred to as the operand scanning algorithm. Input 54-bit operands are split into three 18-bit operands. For performance, loop unrolling is used and various multiplication operations are preferably computed in parallel, reducing the multiplication latency to 12 clock cycles while still adding all the required pipeline registers for DSP multipliers.

Figure 9:
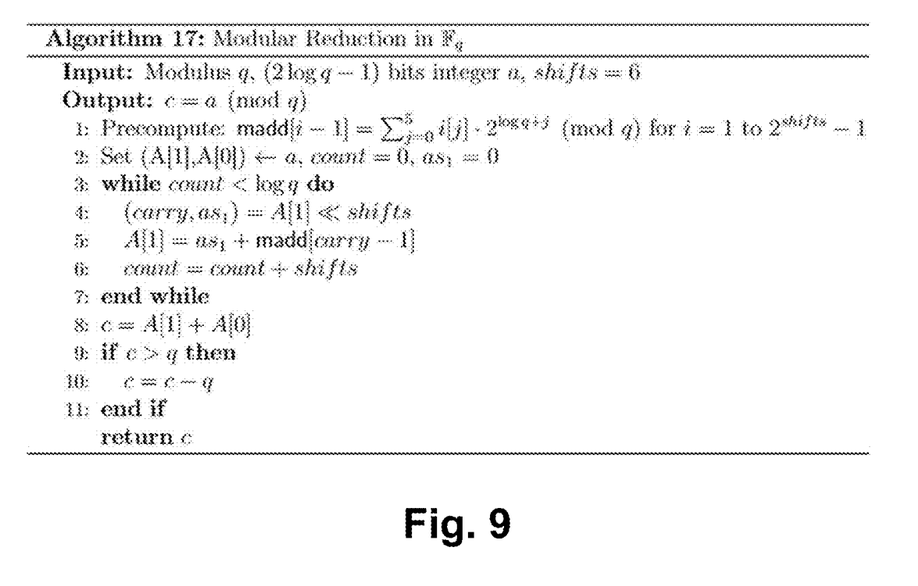
FIG. 9 is a pseudocode description of a technique of FHE modular reduction.

FIG. 9 illustrates an example modular reduction (Mod Reduc 42), which is a particular form that requires only shift and addition operations. For performance, a technique is used that performs multiple bit shifts, requiring only 12 clock cycles for log q=54 for the modular reduction operation. In this example the number of shifts is set to 6, but it is worth noting that this algorithm is generic and can work with any number of bit shifts depending on the latency requirement and space constraints. This algorithm requires precomputing an array {madd} having 63 elements, where each element is (log q)/2 bits wide. In this particular use, modular reduction is performed with respect to 31 different primes, implying that it is necessary to precompute 31 such {madd} arrays requiring ~7 KB of storage space in total. This precompute is done offline, so there is no compute overhead associated with it. All other steps in the proposed algorithm can be performed using inexpensive shift and addition operations.

Referring again to FIG. 2, the final operation that forms each of the 256 sets of functional units is Automorph, which performs permutation for the Rotate operation of FHE. The function of the Automorph unit is to read a polynomial from the on-chip memory and store it in a register file RF in a permuted order per a given rotation index k. Any original slot indexed by i in ciphertext maps to the rotated slot through an automorphism equation, described in Provisional Application, Section 4.1.

Due to the limited number of rotation indices (e.g., about 60 different values) used in bootstrapping, various powers of 5 are precomputed and stored which correspond to each of the rotation index k. Division by two is a simple bit-shift, and reduction modulo N is significantly simplified because N is always a power of two. Thus, reduction modulo N can be achieved by simply performing an {AND} operation with N−1.

To summarize, the functional units in FAB are optimized for the available hardware to reduce resource overhead. They make effective use of high-performance multipliers and adders in DSP blocks to perform low-latency modular arithmetic. FAB efficiently utilizes these functional units through fine-grained pipelining and by issuing multiple scalar operations in a single cycle.

NTT/iNTT and Key Switch Datapaths

In this section, datapath optimizations are described for certain compute-intensive NTT operations and memory-intensive Key Switch operations of the CKKS scheme, efficiently utilizing FAB microarchitecture.

In one embodiment, the NTT datapath uses a unified Cooley-Tukey algorithm for both NTT and inverse-NTT (INTT). Using a unified NTT algorithm provides the convenience of leveraging the same data mapping logic for both NTT and iNTT. Modulo-256 modular addition, subtraction and multiplication units operate in parallel as radix-2 butterfly units, processing 512 coefficients of a polynomial at once, reducing processing time accordingly. NTT address generation unit (shown in FIG. 2) takes care of uniquely mapping the data within each stage of the NTT/iNTT using a sub-unit, i.e. a data mapping unit. Furthermore, a twiddle factor mapping sub-unit within the NTT address generation unit takes care of reading the required twiddle factors for an NTT stage from the URAM miscellaneous bank. Both of these sub-units leverage the data and stage counters to generate the addresses on-the-fly using inexpensive shift, and AND operations. Thus, pipelining and parallelism are leveraged while computing NTT/iNTT by distributing the computations over the functional units, a data mapping unit, and a twiddle factor mapping unit. It is worth noting that the latency of the bit-reversal operation here is not included here, as bit-reversal is carried out along with automorph/multiplication operation that is performed just before NTT/INTT.

Figure 10:
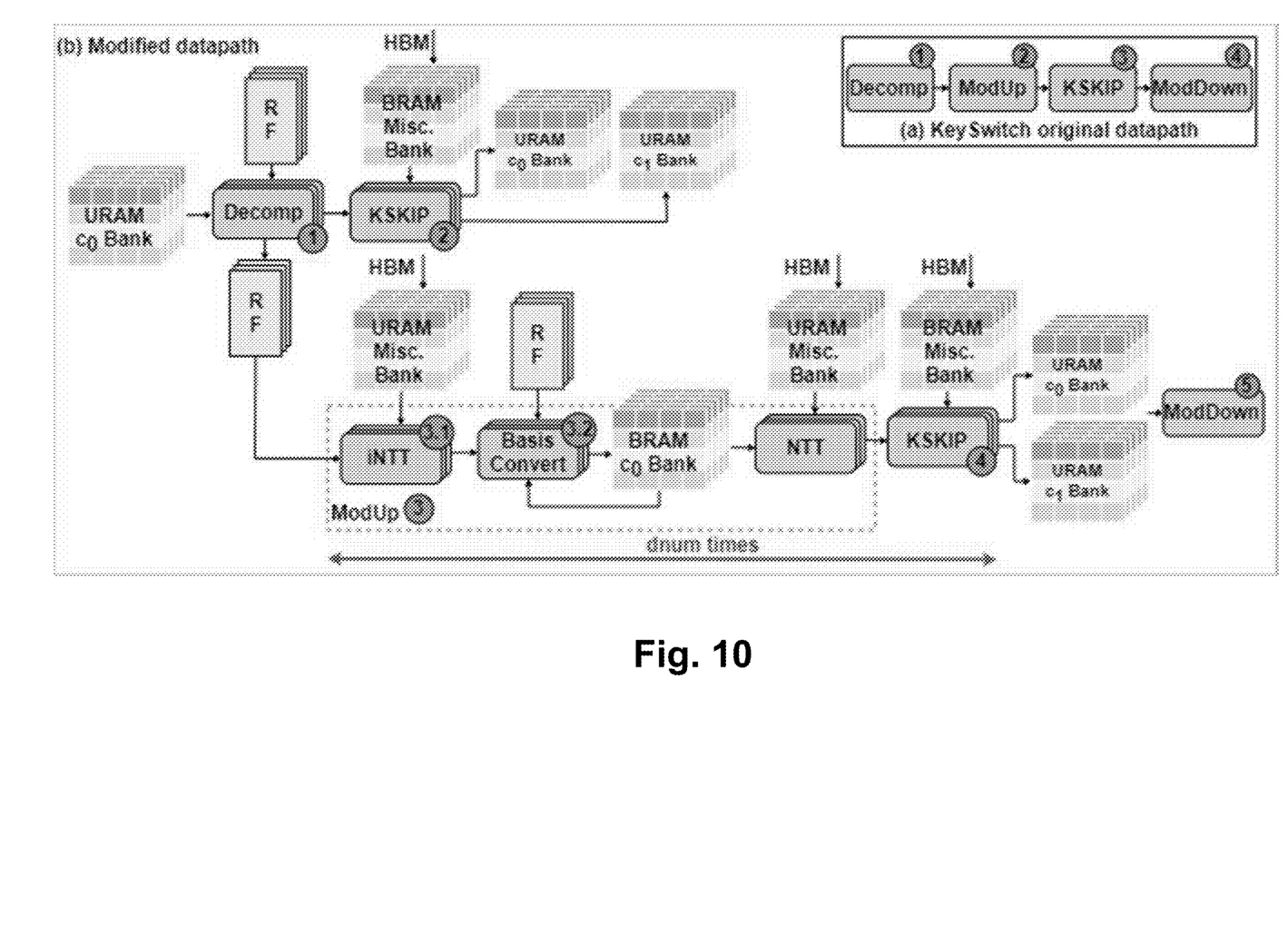
FIG. 10 is a schematic diagram of a Key Switch datapath.

FIG. 10 illustrates datapath aspects for a Key Switch operation used in CKKS. At upper right is shown a nominal flow of operations of the Key Switch operation-decomposition (Decomp), increase modulus (ModUp), inner product (KSKIP), and decrease modulus (ModDown) in sequential order. The remainder of FIG. 10 illustrates a particular datapath used for efficient on-chip memory utilization for these sub-operations, which avoids reads/writes of the ciphertext limbs to the global memory 24 and thus lowers the latency of FHE computing. With limited on-chip memory, the sub-operations require smart operation scheduling to efficiently utilize the on-chip memory. This is because Key Switch not only needs to operate on the extension limbs (the factors of P) but it also needs to perform an inner product with the Key Switch keys that are almost 3× the size of the ciphertext. The scheme of FIG. 10 involves scheduling and organizing the sub-operations to manage ~112 MB of data (84 MB keys and 28 MB ciphertext) within the available 43 MB on-chip memory without writing any resultant limbs back to the global memory 24.

More particularly, the Key Switch operation is optimized by scheduling and reorganizing the sub-operations so as to split the key switch inner product (KSKInProd) step into two steps (step 2 and step 4 in FIG. 10). Instead of performing the KSKInProd step all at once, the process makes progress on the inner product by performing the multiplications and additions as soon as the operands are in memory, which reduces transfers to/from the global memory 24. More specifically, about 112 MB of data (84 MB of keys and 28 MB of ciphertext) are managed within the available 43 MB on-chip memory without writing any resultant ciphertext limbs back to the global memory 24. The modified datapath also reduces the number of NTT computations, which is the most expensive subroutine in Key Switch operation. Through smart operation scheduling, high data reuse is enabled, inherent limb-wise parallelism is exploited, and uniform address generation logic is maintained by avoiding switching between limb-wise and slotwise accesses, along with the reduction of global memory traffic by not writing/reading resultant ciphertext limbs thereto.

Overall operation begins with L limbs in one of the ciphertext ring elements $a_m$ (ciphertext has two ring elements $a_m$ and $b_m$) that are in evaluation representation. The Decomp step divides these L limbs into β≤dnum blocks of α limbs each. These α limbs then take two paths. First, they are used to begin the KSKInProd (KSKIP step 2 in FIG. 10), with the intermediate sum being written out to URAM. This KSKIP operation is performed as the α limbs are still in evaluation representation. Second, these α limbs are input to a second path beginning with the iNTT step 3.1, so that the extension limbs can be generated. Once these extension limbs are generated, they are used to complete the KSKIP operation at KSKIP step 4.

Therefore, with this datapath modification, operation avoids writing the limbs to off-chip memory in coefficient representation after the ModUp step, reading the limbs back again into on-chip memory, and converting the limbs into evaluation representation to perform the KSKInProd. The modified datapath not only reduces the number of NTT computations (the most expensive subroutine in Key Switch operation) but also helps alleviate the memory bandwidth bottleneck by reducing memory traffic.

FIG. 10 shows the modified datapath only for the first three operations, DeComp, ModUp, and KSKIP. The ModDown operation is analogous to the ModUp operation and can use scheduling similar to that shown for ModUp.

Note that splitting KSKInProd into two steps does not change the Key Switch algorithm, only the order in which its steps are performed. The resulting noise from the Key Switch algorithm is identical with or without this reordering.

It is also noted that the improved Key Switch datapath is generally applicable to any FHE scheme, including for example BGV and BFV, that has a similar key switch operation.

Figure 11:
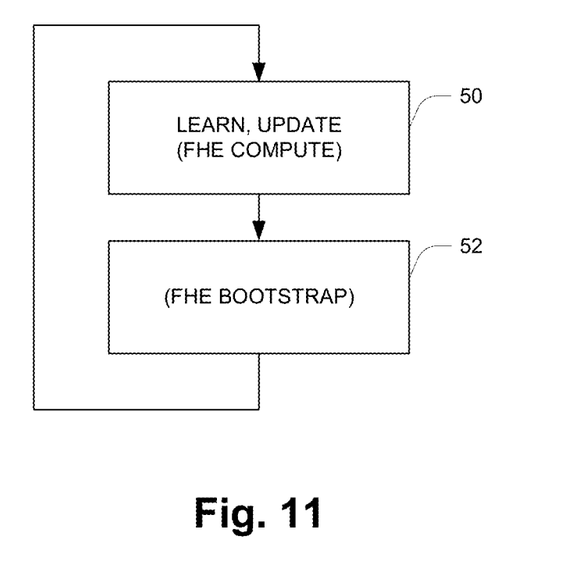
FIG. 11 is a simplified flow diagram of a training application having an iterative nature, with FHE bootstrapping being used at each iteration.

FIG. 11 is a simplified flow chart for an example application of linear regression (LR) training for binary classification over a set of data. The important aspect here is the iterative nature of the training process and its relation to FHE bootstrapping. In one example, an LR model is trained for 30 iterations, each including one extended period of learning 50 which concludes with a corresponding update of the LR model. As indicated, FHE-based computations are used in this period 50, and then a bootstrapping operation is performed at 52 before a next iteration is begun.

CKKS FHE and Associated Parameters

In the approach herein, FPGAs in particular are contemplated as they enable the design of custom hardware solutions that provide practical performance that can outperform CPU/GPU solutions, which at the same time being comparatively inexpensive relative to ASIC solutions. Use of FPGAs also provides a quick turnaround time for design updates, providing resilience to future FHE algorithm changes. The disclosed example supports the Cheon-Kim-Kim-Song (CKKS) FHE scheme in particular. FAB makes use of state-of-the-art analysis of the bootstrapping algorithm to design the FHE operations and select parameters that are optimized for the hardware constraints. This allows FAB to support practical FHE parameter sets (i.e. parameters large enough to support bootstrapping) without being bottlenecked by main-memory bandwidth, and without sacrificing computing efficiency.

In one example, FAB is architected for the Xilinx Alveo U280 FPGA accelerator card containing High Bandwidth Memory (HBM2). FAB is highly resource efficient, requiring only 256 functional units, where each functional unit supports various modular arithmetic operations. FAB exploits maximal pipelining and parallelism by utilizing these functional units per the computational demands of the FHE operations. FAB also makes efficient use of limited memory resources (e.g., 43 MB on-chip memory and 2 MB register files) to manage the >100 MB working dataset. FAB leverages a smart operation scheduling to enable high data reuse and prefetching of the required datasets from global memory without stalling the functional units. The smart scheduling evenly distributes the accesses to global memory to efficiently utilize the limited main memory bandwidth through homogeneous memory traffic.

In one example, a CKKS implementation as set forth in detail in the Provisional Application Section 2 is supported. This example utilizes the following parameter types and specific values:

| Parameter | Description | Example value |
| --- | --- | --- |
| N | Number of coefficients in ciphertext polynomial | $2^{16}$ |
| n | Number of plaintext elements in ciphertex t(n ≤ N/2) | |
| Q | Full modulus of ciphertext coefficient | |
| q | Prime modulus and a limb of Q | logq = 54 (i.e., 54-bit limbs) |
| L | Maximum number of limbs in ciphertext | 23 |
| l | Current number of limbs in ciphertext | |
| dnum | Number of digits in switching key | 3 |
| a | Number of limbs that comprise a single digit in the key-switching decomposition (fixed throughout computation) | |
| P | Product of the extension limbs added for the raised modulus. There are a + 1 extension limbs. | |
| fftIter | Multiplicative depth of linear transform in bootstrapping. | 4 |

System/Device Realizations

There are several types of potential realizations of the disclosed technique. One realization is a physical computing unit encompassing one or more FPGAs that can run the FHE compute solution. Such a unit may be plugged into existing data centers using either PCIe slot or through high-speed network connection. In another realization, there could be an efficient mapping of FHE compute applications written in a high-level programming language (e.g., C/C++) to an FPGA. An existing FHE compiler/transpiler can be used to translate the program written in any programming language to an intermediate representation (IR) and then map the IR to an FPGA. A third potential realization would be a soft IP version having an entire software stack and RTL code base with mapping directly to FPGA-based accelerators such as already deployed on cloud servers.

The disclosure herein demonstrates the performance improvement for CKKS FHE scheme that supports operations on real numbers. The technique can be extended to other FHE schemes like BGV and BFV as these schemes have similar overall mathematical structure. Thus, support can be enabled for operations on integers as well and a wide variety of applications. Moreover, the technique can be implemented on different types of FPGAs beyond the specific example of a Xilinx Alveo U280 FPGA board. The design is generally parameterized, meaning that based on the underlying FPGA various parameters like datapath bitwidth can be fine-tuned to leverage specific resources on the FPGA. Furthermore, to boost performance of an application, the technique can be scaled to multiple FPGAs by running a similar set of operations on multiple ciphertexts in parallel.

While various embodiments of the invention have been particularly shown and described, it will be understood by those skilled in the art that various changes in form and details may be made therein without departing from the scope of the invention as defined by the appended claims.

What is claimed is:

1. A computing device comprising an FPGA semi-custom accelerator device for hardware acceleration of modular arithmetic operations in a cryptography system employing a cyphertext modulus Q with associated operand bit-width log q ("q"), the semi-custom accelerator device including an array of N sets of functional units configured for parallel operation on corresponding ones of N streams of c-bit-width coefficients and producing corresponding ones of N streams of results, comprising:

an interface to a host CPU configured to execute a fully homomorphic encryption (FHE) application using the FPGA semi-custom accelerator device for bootstrappable FHE (FAB) operations with selection of parameters that are optimized for hardware constraints;

on-chip memory for storing $^vq$-width operands and $^vq$-width results, wherein the memory has one or more banks each organized as a two-dimensional arrangement of fixed-size memory units of bit-width m≠c, the two-dimensional arrangement having a width W and depth D of memory units, W being selected to enable storage of an integer number Wm/c of the c-bit-width coefficients across the width of the arrangement, D being selected as a quotient N/(Wm/c) to enable simultaneous retrieval of N coefficients in a single memory access cycle; and an arithmetic unit coupled to the memory to receive the $^vq$-width operands and produce the $^vq$-width results, the arithmetic unit including (1) a plurality p of standard arithmetic blocks having $^vq/p$ bit-width, the arithmetic blocks operating on corresponding distinct $^vq/p$-width portions of the $^vq$-width operands and producing corresponding distinct $^vq/p$-width portions of the $^vq$-width results, and (2) custom logic interconnecting the arithmetic blocks in a manner providing for an overall $^vq$-width arithmetic operation to produce the $^vq$-width results from the $^vq$-width operands, wherein the array of N sets of functional units efficiently utilizes the memory units of the FPGA on-chip memory and maps data width of the coefficients to that of the memory banks to enable storage of up to a predetermined amount of data on-chip to reduce resource overhead.

2. The computing device of claim 1, wherein p=2.

3. The computing device of claim 1, wherein the custom logic includes (1) pipeline registers for receiving respective $^vq/p$-width portions of modulus values and time-aligning them with respective outputs of the p arithmetic blocks, (2) additional standard arithmetic blocks for operating on respective time-aligned $^vq/p$-width portions of modulus values and outputs of the p arithmetic blocks to produce respective portions of modulus-reduced arithmetic results, and (3) selection logic for selecting between the outputs of the p arithmetic blocks and the modulus-reduced arithmetic results to produce the $^vq$-width results.

4. The computing device of claim 3, wherein the selection logic is configured to realize a multi-condition selection based on values of respective carry outputs from the standard p arithmetic blocks, the multi-condition selection being based partly on a most-significant carry output being asserted and there being corresponding selection-specific mathematical relationships between the time-aligned $^vq/p$-width portions of modulus values and the respective outputs of the p arithmetic blocks.

5. The computing device of claim 1, wherein the FPGA semi-custom accelerator device further includes:

a modular reduction unit coupled to the arithmetic unit to receive (2*$^vq$−1)-width non-reduced values and produce corresponding $^vq$-width reduced values, the modular reduction unit including (1) a shifter operative to produce a first intermediate value v1 by a predetermined number of shifts of a second intermediate value v2, (2) an adder to produce v2 by adding v1 to a pre-computed modulus adder value, and (3) second custom logic to (a) first initialize v2 to a most-significant part of a non-reduced value from the arithmetic unit, (b) then iteratively operate the shifter and adder over successive cycles to produce a final second intermediate value v2f, and (c) then combine v2f with a least-significant part of the non-reduced value from the arithmetic unit to produce the corresponding $^vq$-width reduced value.

6. The computing device of claim 5, wherein the modular reduction unit is further configured and operative to perform modular reduction with respect to a set of prime elements stored as respective arrays in the memory.

7. The computing device of claim 1 further providing for hardware acceleration of a key switch operation of the FHE application, the key switch operation converting a first ciphertext M1 decryptable under a first key to a same-message second ciphertext M2 decryptable under a distinct second key, wherein:

the memory is further configured for storing operands and results of the key switch operation; and the FPGA semi-custom accelerator device further includes a set of computing elements including a decomposition unit, an up-modulus unit, an inner product unit, and a down-modulus unit, the decomposition unit configured to generate blocks of first limbs of M1, the inner product unit having first and second sub-units, the first sub-unit configured to perform a first part of an inner product operation on the first limbs from the decomposition unit and producing an intermediate result, the second sub-unit configured to perform a remaining part of the inner product operation using the intermediate result and extended limbs generated by the up-modulus unit from the first limbs, the down-modulus unit configured to perform a modulus-reducing operation on extended-modulus results from the inner product unit to produce M2.

8. The computing device of claim 7, wherein the first part of the inner product operation includes providing the first limbs in evaluation representation to the up-modulus unit to generate the extended limbs for use in the remaining part of the inner product operation, while avoiding use of off-chip memory for temporarily storing the limbs in coefficient representation after an up-modulus operation.

9. The computing device of claim 1, wherein the FPGA semi-custom accelerator device further includes an Automorph unit which performs permutation for a Rotate operation of the FHE application.

10. The computing device of claim 9, wherein the permutation by the Automorph unit includes reading a polynomial from the on-chip memory and store storing the polynomial in a register file in a permuted order per a given rotation index k.

* * * * *